(12) United States Patent
Lu et al.

(10) Patent No.: US 11,181,691 B2
(45) Date of Patent: Nov. 23, 2021

(54) OPTICAL SIGNAL GENERATING APPARATUS

(71) Applicant: Centera Photonics Inc., Hsinchu (TW)

(72) Inventors: Guan-Fu Lu, Taichung (TW);
Chen-Ying Chuang, Hsinchu County (TW)

(73) Assignee: Centera Photonics Inc., Hsinchu (TW)

(*) Notice: Subject to any disclaimer, the term of this patent is extended or adjusted under 35 U.S.C. 154(b) by 0 days.

(21) Appl. No.: 17/005,334

(22) Filed: Aug. 28, 2020

(65) Prior Publication Data

US 2021/0080646 A1 Mar. 18, 2021

(30) Foreign Application Priority Data

Sep. 12, 2019 (TW) .................................. 108132939

(51) Int. Cl.
*G02B 6/12* (2006.01)
*G02B 6/125* (2006.01)
*G02B 6/293* (2006.01)

(52) U.S. Cl.
CPC ......... *G02B 6/125* (2013.01); *G02B 6/12007* (2013.01); *G02B 6/29301* (2013.01); *G02B 6/293* (2013.01); *G02B 6/2938* (2013.01)

(58) Field of Classification Search
CPC .... G02B 6/12007; G02B 6/125; G02B 6/293; G02B 6/29301; G02B 6/2938
See application file for complete search history.

(56) References Cited

U.S. PATENT DOCUMENTS

| | | | |
|---|---|---|---|
| 6,839,478 B2* | 1/2005 | Huber | G02B 6/122 385/125 |
| 6,876,794 B2* | 4/2005 | Zheng | G02B 6/125 385/124 |
| 7,283,694 B2 | 10/2007 | Welch et al. | |
| 7,437,075 B2 | 10/2008 | Doerr et al. | |
| 8,948,555 B1* | 2/2015 | Roth | G02B 6/12002 385/45 |
| 9,235,100 B1* | 1/2016 | Kaplan | H04B 10/541 |
| 9,488,783 B2* | 11/2016 | Hasegawa | G02B 6/122 |
| 10,852,137 B2* | 12/2020 | Bischel | G01C 19/721 |
| 2010/0110443 A1* | 5/2010 | Cheben | G01J 3/4532 356/454 |
| 2018/0056702 A1* | 3/2018 | Watanabe | G01J 1/58 |

FOREIGN PATENT DOCUMENTS

| | | |
|---|---|---|
| EP | 1517173 | 3/2005 |
| WO | 9219995 | 11/1992 |

* cited by examiner

*Primary Examiner* — Ryan A Lepisto
(74) *Attorney, Agent, or Firm* — JCIPRNET

(57) ABSTRACT

An optical signal generating apparatus is provided. A plurality of optical waveguides is disposed in different dielectric layers. A first light splitting pattern and a second light splitting pattern are disposed in the optical waveguides. The first light splitting pattern includes a first heterogeneous layer portion intersected with the second light splitting pattern in different dielectric layers to form at least one first intersection, the first heterogeneous layer portion and the second light splitting pattern are disposed in different optical waveguides, and a light beam with a specific wavelength, transmitted by the first light splitting pattern, is subject to a layer-to-layer transition before reaching the first intersection, so as to enter different optical waveguides.

10 Claims, 5 Drawing Sheets

OPTICAL SIGNAL GENERATING APPARATUS

CROSS-REFERENCE TO RELATED APPLICATION

This application claims the priority benefit of Taiwan application serial no. 108132939, filed on Sep. 12, 2019. The entirety of the above-mentioned patent application is hereby incorporated by reference herein and made a part of this specification.

BACKGROUND

Technical Field

The disclosure relates to a signal generating apparatus, and more particularly, to an optical signal generating apparatus.

Description of Related Art

With the development of various applications such as communication software, high-definition video and audio, and online streaming, the amount of data generated by each person grows exponentially. Wavelength division multiplexing (WDM) is a technology that is increasingly used to provide a higher transmission capacity in an optical network. In the WDM technology, a single-layer planar optical waveguide is generally adopted for light splitting, and the planar optical waveguide may split light beams with different wavelengths and transmit the light beams to an optical modulator for modulation to generate a plurality of optical signals. In order to meet the requirements of optical communication, an optical waveguide structure needs to be characterized by low loss, small wafer area, and so on. However, as the transmission capacity requirement grows, the waveguide density is increased accordingly. And thus, in a waveguide layout, there is often a need for waveguide intersection, in which the optical loss is easily caused.

SUMMARY

The disclosure provides an optical signal generating apparatus, which may effectively avoid optical loss caused by waveguide intersection and reduce a wafer area.

The optical signal generating apparatus of the disclosure includes a multilayer optical waveguide structure and an optical modulator module. A plurality of optical waveguides is disposed in different dielectric layers. A first light splitting pattern and a second light splitting pattern are disposed in the optical waveguides, and the first and second light splitting patterns transmit and split lights beam with a plurality of specific wavelengths respectively to generate a plurality of split light beams. The optical modulator module is optically coupled to the multilayer optical waveguide structure, and configured to modulate the split light beams to generate a plurality of optical signals. The first light splitting pattern includes a first heterogeneous layer portion intersected with the second light splitting pattern in different dielectric layers to form a first intersection, the first heterogeneous layer portion and the second light splitting pattern are disposed in different optical waveguides, and the light beam with the specific wavelength, transmitted by the first light splitting pattern, is subject to a layer-to-layer transition before reaching the first intersection, so as to enter different optical waveguides.

In an embodiment of the disclosure, the light splitting patterns respectively include a plurality of branch points, and the light beams with different wavelengths enter different optical waveguides by layer-to-layer transition when being guided to at least one branch point.

In an embodiment of the disclosure, the light beams with different wavelengths are subject to the layer-to-layer transition through overlapping parts of the optical waveguides and are guided to different optical waveguides.

In an embodiment of the disclosure, the split light beams corresponding to the first and second light splitting patterns have different wavelengths.

In an embodiment of the disclosure, the first and second light splitting patterns form at least one light splitting pattern group, and a wavelength difference among a plurality of light beams corresponding to the light splitting pattern group is less than a default value.

In an embodiment of the disclosure, the light splitting pattern group corresponds to an optical modulation element to respectively generate the optical signals.

In an embodiment of the disclosure, the optical waveguides further include a third light splitting pattern and a fourth light splitting pattern, where the third light splitting pattern includes a second heterogeneous layer portion intersected with the fourth light splitting pattern in different dielectric layers to form a second intersection, the second heterogeneous layer portion and the fourth light splitting pattern are disposed in different optical waveguides, and the light beam with the specific wavelengths, transmitted by the third light splitting pattern, is subject to the layer-to-layer transition before reaching the second intersection, so as to enter different optical waveguides.

In an embodiment of the disclosure, the first light splitting pattern includes a Y-shaped branch pattern, configured to split a corresponding light beam to generate $2^m$ split light beams, m being a positive integer.

In an embodiment of the disclosure, the optical signal generating apparatus further includes a light source module, optically coupled to the multilayer optical waveguide structure, and configured to emit the light beams with different wavelengths.

In an embodiment of the disclosure, the optical signal generating apparatus further includes a controller, coupled to the optical modulator module to drive a plurality of optical modulation elements in the optical modulator module.

Based on the above, the multilayer optical waveguide structure of the disclosure includes the optical waveguides, which may perform layer-to-layer transition on the light beams with different wavelengths before the light beams are guided to the intersection of the light splitting patterns, so that the light beams with different wavelengths enter different optical waveguides, thereby effectively avoiding optical loss caused by excessive intersections of the waveguides in a same layer, and reducing the wafer area.

In order to make the aforementioned and other advantages of the disclosure comprehensible, embodiments accompanied with figures are described in detail below.

DESCRIPTION OF THE EMBODIMENTS

Figure 1:
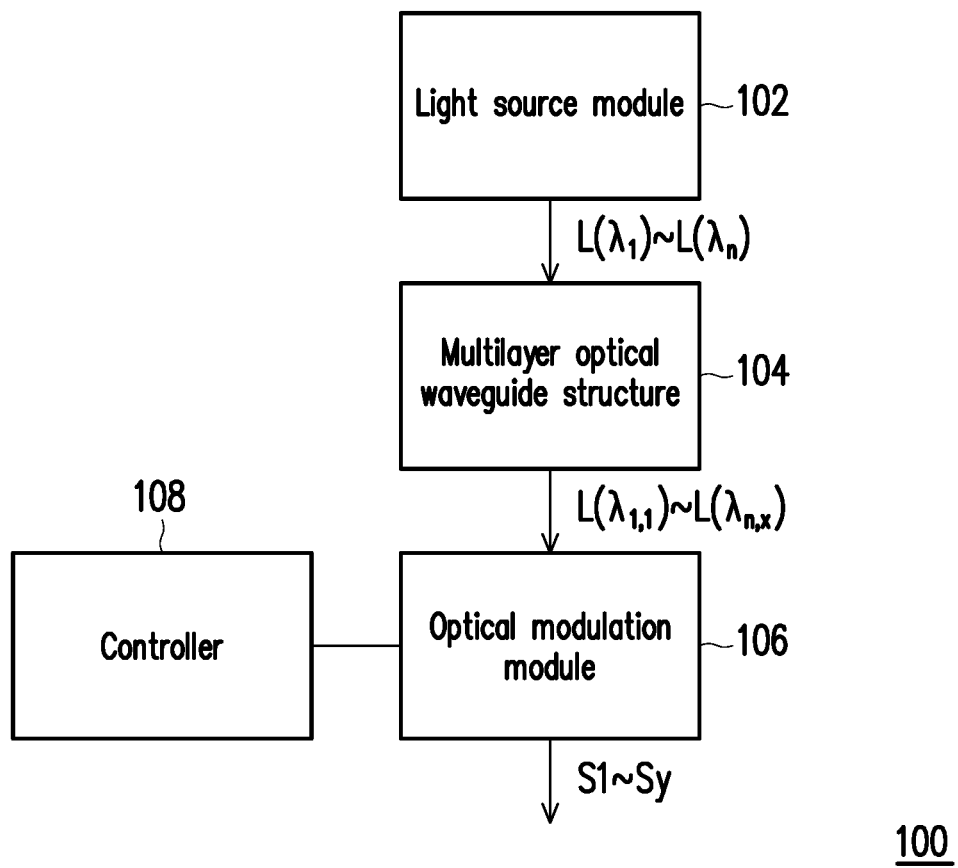
FIG. 1 is a schematic diagram of an optical signal generating apparatus in accordance with an embodiment of the disclosure.

Please refer to FIG. 1. FIG. 1 is a schematic diagram of an optical signal generating apparatus in accordance with an embodiment of the disclosure. An optical signal generating apparatus 100 may include a light source module 102, a multilayer optical waveguide structure 104, an optical modulation module 106, and a controller 108. The multilayer optical waveguide structure 104 is optically coupled to the light source module 102 and the optical modulation module 106, and the controller 108 is coupled to the optical modulation module 106. The multilayer optical waveguide structure 104 and the optical modulation module 106 may be integrated into an optical chip, and the controller 108 may be an electrical chip. In an embodiment of the disclosure, the term "two elements A and B are optically coupled to each other" means that a light beam transmitted in the element A may enter the element B, and vice versa.

The light source module 102 may be, for example, a laser module that emits a plurality of light beams $L(\lambda_1)$-$L(\lambda_n)$ with different wavelengths, n being an integer greater than 1. The laser module may be, for example, a laser diode (LD) chip, but the disclosure is not limited thereto.

The multilayer optical waveguide structure 104 may be implemented, for example, as a multilayer dielectric substrate, and may include a plurality of optical waveguides. Each optical waveguide includes at least one light splitting pattern. Each light splitting pattern may receive or transmit the light beams $L(\lambda_1)$-$L(\lambda_n)$ with different wavelengths, respectively, and each light splitting pattern may split the corresponding light beam of a specific wavelength to generate a plurality of split light beams. For example, the light beam $L(\lambda_1)$ is split into $L(\lambda_{1,1})$ to $L(\lambda_{1,x})$, and the light beam $L(\lambda_n)$ is split into $L(\lambda_{n,1})$ to $L(\lambda_{n,x})$, where x is an integer greater than 1. The light splitting patterns of different optical waveguides may have a plurality of intersections from a plan view. The multilayer optical waveguide structure 104 may perform layer-to-layer transition before the light beams $L(\lambda_1)$-$L(\lambda_n)$ are guided to the intersection such that the light beams $L(\lambda_1)$-$L(\lambda_n)$ enter different optical waveguides respectively to avoid waveguide intersection loss. In an embodiment of the disclosure, different optical waveguides are disposed in different dielectric layers in a semiconductor structure respectively. In another embodiment, different optical waveguides may be disposed in a same dielectric layer but in different blocks to avoid mutual intersection in the same layer. In addition, a single light splitting pattern of the disclosure may be disposed in different optical waveguides, and the light beam transmitted in the specific single light splitting pattern may be transited at different layers. For example, a first light splitting pattern has at least one first heterogeneous layer portion. The first heterogeneous layer portion and a second light splitting pattern are disposed in different optical waveguides, and intersect in different dielectric layers to form at least one first intersection. A light beam with a specific wavelength, transmitted by the first light splitting pattern, is subject to a layer-to-layer transition so as to enter different optical waveguides at different layers before reaching the first intersection.

In addition, in other embodiments, the multilayer optical waveguide structure 104 may include more other light splitting patterns. For example, the aforesaid multilayer optical waveguide structure 104 may further include, a third light splitting pattern and a fourth light splitting pattern. And similarly, the third light splitting pattern has at least one second heterogeneous layer portion disposed in the different optical waveguides from the fourth light splitting pattern disposed. The second heterogeneous layer portion and the fourth light splitting pattern intersect in different dielectric layers to form at least one second intersection, and a light beam with a specific wavelength, transmitted by the third light splitting pattern, is subject to a layer-to-layer transition so as to enter different optical waveguides at different layers before reaching the second intersection.

Figure 2:
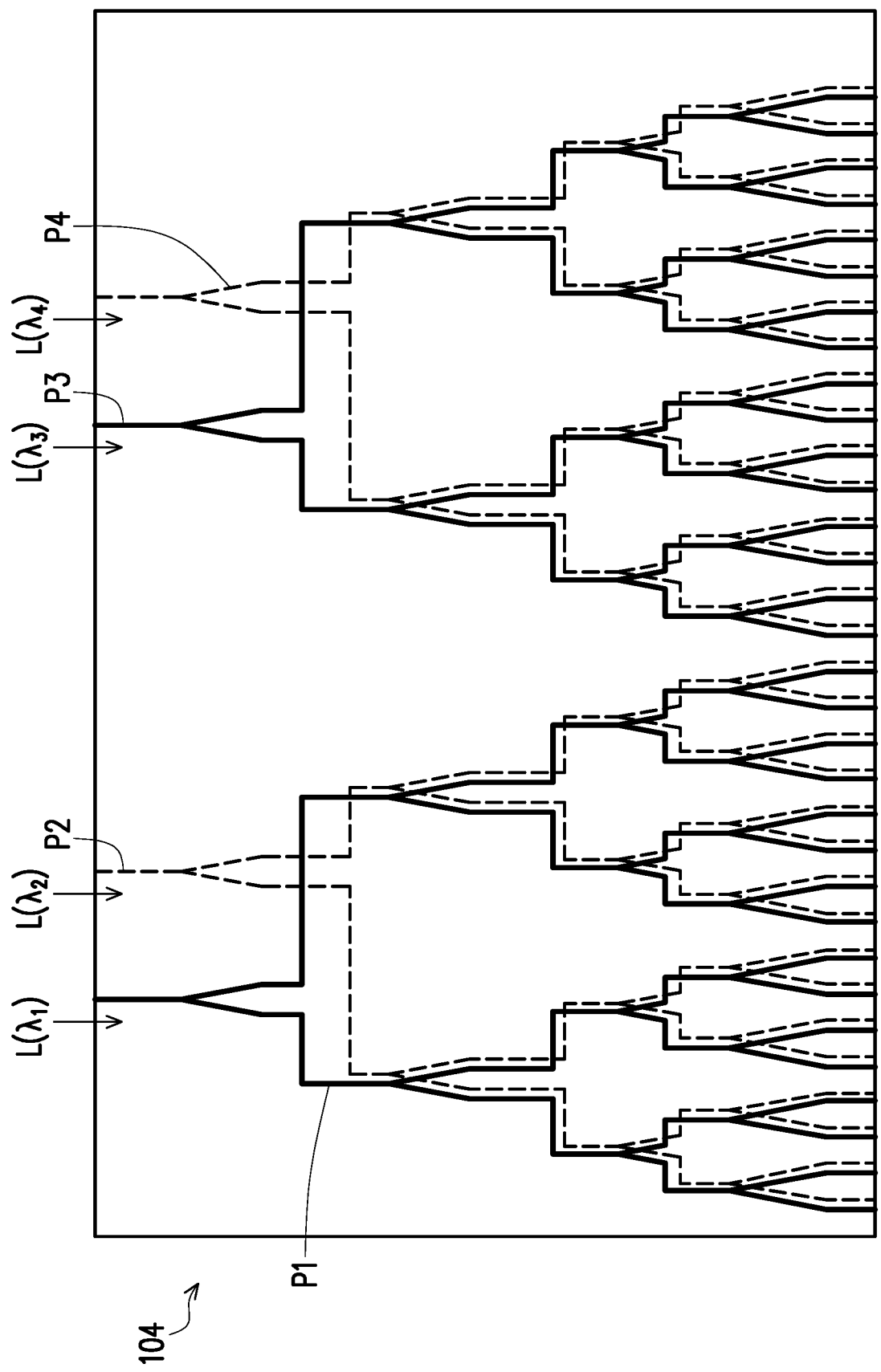
FIG. 2 is a schematic diagram of a multilayer optical waveguide structure in accordance with an embodiment of the disclosure.

For example, the multilayer optical waveguide structure 104 may include two optical waveguides in different dielectric layers, each optical waveguide including two light splitting patterns. For example, as shown in FIGS. 2, P1 and P3 denote two light splitting patterns of the first optical waveguide, which respectively receive light beams $L(\lambda_1)$ and $L(\lambda_3)$ with specific wavelengths, and P2 and P4 denote two light splitting patterns of the second optical waveguide, which respectively receive light beams $L(\lambda_2)$ and $L(\lambda_4)$ with specific wavelengths. The light splitting pattern P1 and the light splitting pattern P2 form a plurality of intersections (i.e., intersections of solid lines and broken lines), and the light beams $L(\lambda_1)$ and $L(\lambda_2)$ may be guided to the first optical waveguide and the second optical waveguide respectively and thus split by the light splitting patterns P1 and P2 to generate a plurality of split light beams. In the present embodiment, the light splitting patterns P1 to P4 may be, for example, Y-shaped branch patterns, respectively. Depending on the number of branches, the light splitting patterns P1 to P4 may generate, for example, $2^m$ split light beams respectively, where m is a positive integer. Since the light splitting pattern P1 and the light splitting pattern P2 belong to the first optical waveguide and the second optical waveguide respectively, the light beams $L(\lambda_1)$ and $L(\lambda_2)$ are actually transmitted in different optical waveguides and crossed over at the intersection of the light splitting patterns P1 and P2 in different layers shown in FIG. 2, so as to avoid optical loss when light beams cross at the intersection in single layer waveguide. In addition, in other embodiments of the disclosure, other than the Y-shaped branch pattern, the light splitting pattern may comprise an optical ring resonator or a multi-mode interference (MMI) optical coupler to achieve the effect of light splitting.

Figure 3:
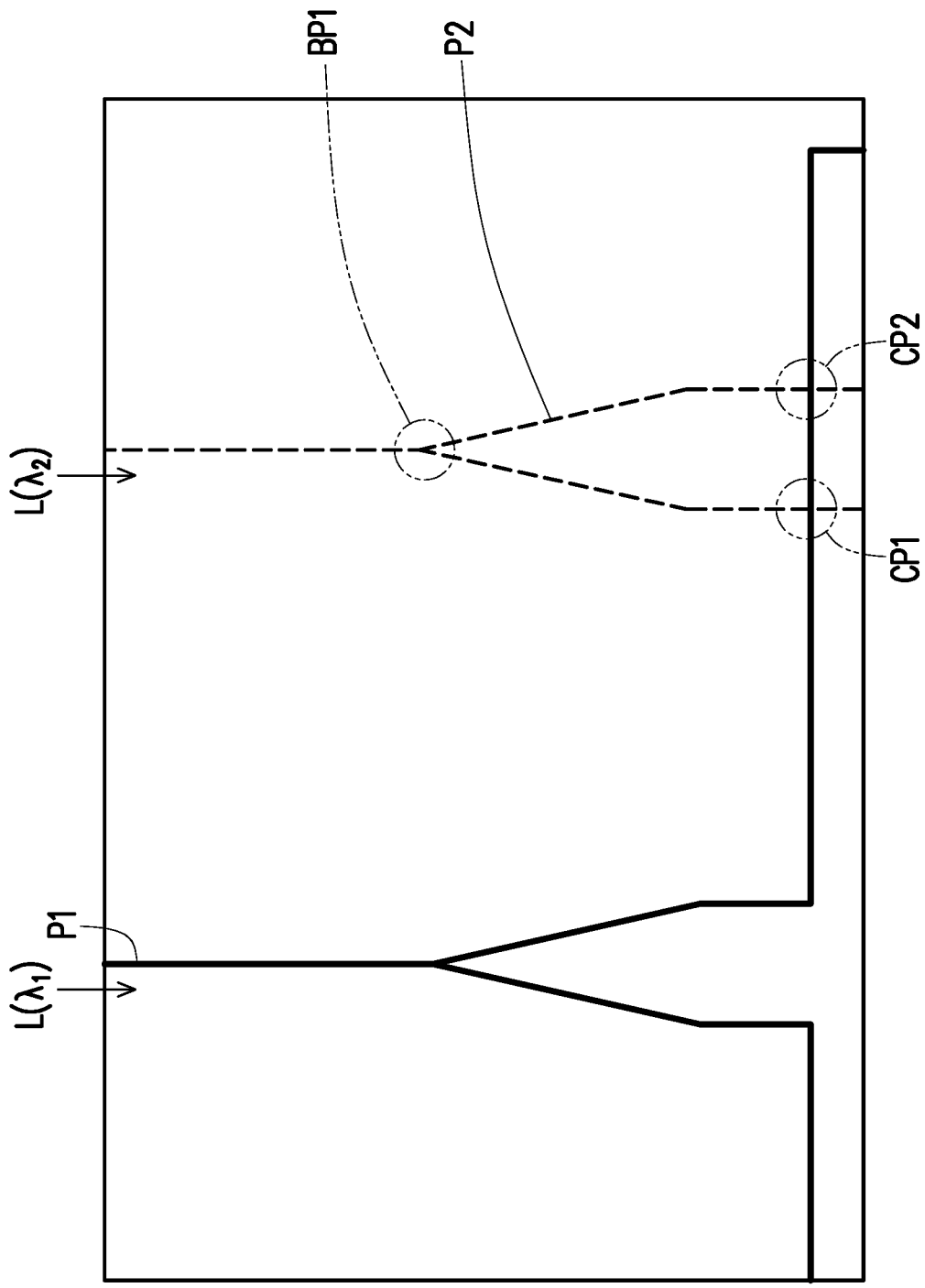
FIG. 3 is a schematic diagram of a multilayer optical waveguide structure in accordance with another embodiment of the disclosure.

The light beams $L(\lambda_1)$ and $L(\lambda_2)$ must be guided to the first optical waveguide and the second optical waveguide respectively before reaching the intersection of the light splitting pattern P1 and the light splitting pattern P2. For example, as shown in FIG. 3, the light beams $L(\lambda_1)$ and $L(\lambda_2)$ may be first transmitted in a same optical waveguide (e.g., the first optical waveguide), and the light beam $L(\lambda_2)$ may enter the second optical waveguide by layer-to-layer transition when reaching a first branch point BP1 of the light splitting pattern P2. So when transmitted to the intersection points CP1 and CP2, the light beams $L(\lambda_1)$ and $L(\lambda_2)$ have been in different optical waveguides respectively so as to avoid the optical loss caused by excessive intersections of the waveguides in the same layer. In other embodiments of the disclosure, since the transmitted light beams with different wavelengths are increased, the number of light splitting patterns is also increased. For convenience of structural design, the light splitting pattern P1 and the light splitting pattern P2 may intersect in the same layer at specific intersection points, and intersect in different layers at other intersection points in the foregoing manner after considering the transmission efficiency. In addition, since the first optical waveguide and the second optical waveguide are spatially stackable, the wafer area can be effectively reduced. The light beam $L(\lambda_2)$ may enter the second optical waveguide before or after reaching the first branch point BP1 of the light splitting pattern P2, as long as it enters the second optical waveguide before reaching the intersection points CP1 and CP2.

Figure 4:
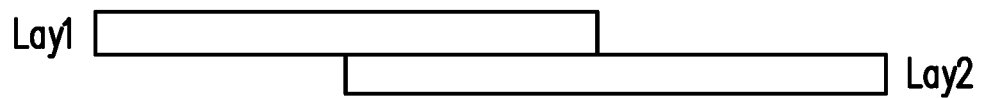
FIG. 4 is a schematic diagram of a multilayer optical waveguide structure in accordance with another embodiment of the disclosure.

The multilayer optical waveguide structure 104 may perform layer-to-layer transition on the light beam as shown in FIG. 4. Different optical waveguides Lay1 and Lay2 are overlapped, and through the overlapping portion, the light beam can be transited between the optical waveguides Lay1 and Lay2, from Lay1 to Lay2 or from Lay2 to Lay1.

Similarly, when transmitted in the light splitting patterns P3 and P4 of the first optical waveguide and the second optical waveguide, respectively, the light beams $L(\lambda_3)$ and $L(\lambda_4)$ may avoid a problem of intersection loss. The implementation manner thereof is similar to the above description, and the descriptions thereof are omitted herein.

In addition, referring to FIG. 1, the optical modulator module 106 may be controlled by the controller 108 to modulate the split light beams $L(\lambda_{1,1})$-$L(\lambda_{n,x})$ to generate a plurality of optical signals S1-Sy, where y is a positive integer. It is to be noted that in the embodiment of FIG. 2, light splitting patterns of different optical waveguides may be divided into a same light splitting pattern group according to the wavelength of the received light beam, where the light splitting patterns in the same light splitting pattern group are configured to split light beams with different but closed wavelengths. For example, the light splitting patterns P1 and P2 are divided into one light splitting pattern group, and the light splitting patterns P3 and P4 are divided into another light splitting pattern group. In the optical modulation module 106, the optical modulation elements integrated in a single chip have restricted capacity to process a limited range of wavelengths. So in some embodiments, the difference of the wavelengths corresponding to the different light beams in the same light splitting pattern group must be designed less than a default value, preventing the range of wavelength from spreading too broad to be handled by the optical modulation elements in the optical modulation module 106. In addition, FIG. 2 is implemented by taking two light splitting pattern groups as an example. However, the number of the light splitting pattern groups is not limited to that in the embodiment of FIG. 2 and the number of light splitting patterns included in the light splitting pattern group is not necessarily limited to be the same.

Figure 5:
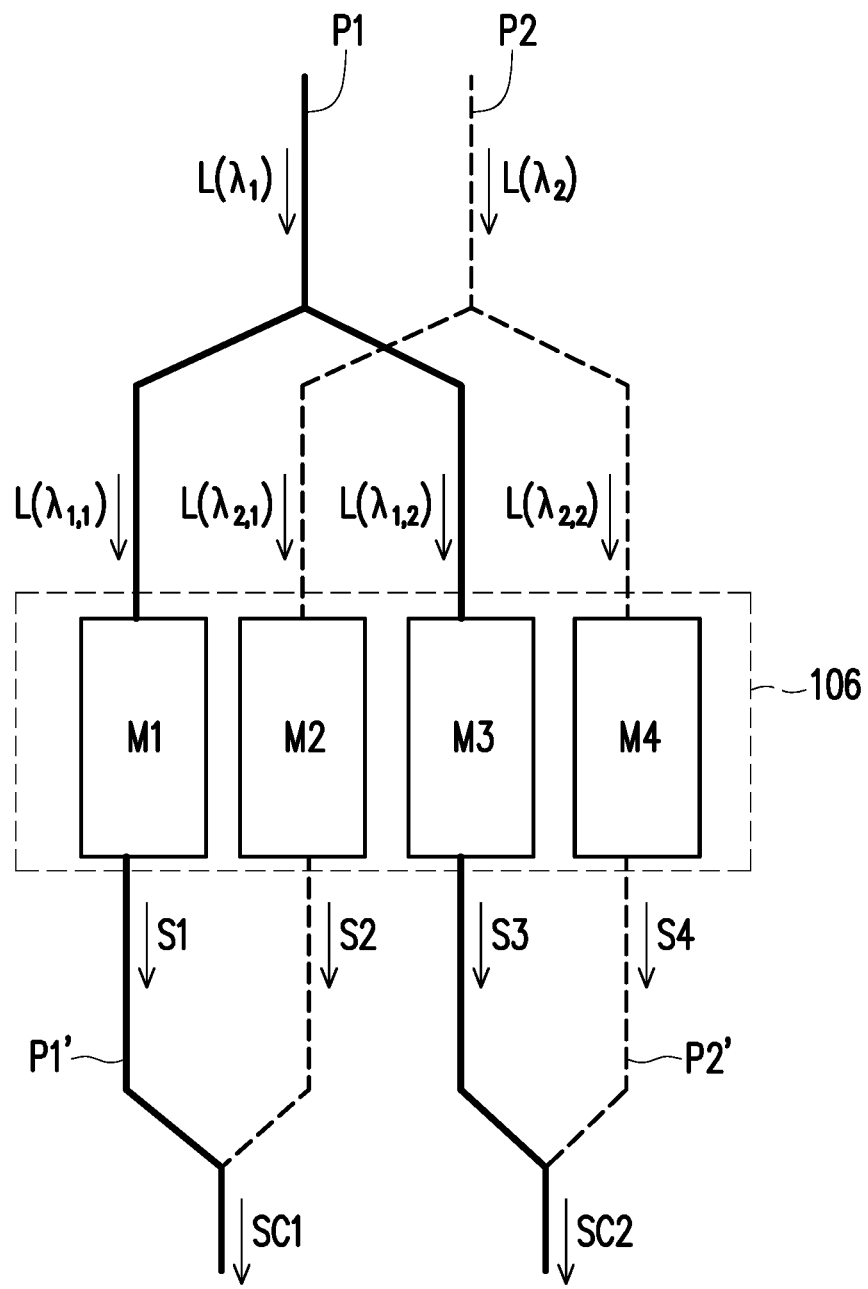
FIG. 5 is a schematic diagram of an optical signal generating apparatus in accordance with another embodiment of the disclosure.

In some embodiments, the multilayer optical waveguide structure 104 may further include a plurality of light combining patterns, and the multilayer optical waveguide structure 104 may perform layer-to-layer transition on a plurality of optical signals with different wavelengths to guide the optical signals into a same optical waveguide to generate a light combined signal. For example, FIG. 5 is a schematic diagram of an optical signal generating apparatus in accordance with another embodiment of the disclosure. As shown in FIG. 5, the optical modulation module 106 may include a plurality of optical modulation elements M1-M4, where the optical modulation elements M1 and M3 are configured to optically modulate the split light beams $L(\lambda_{1,1})$ and $L(\lambda_{1,2})$ generated by the light splitting pattern P1 to generate optical signals S1 and S3, and the optical modulation elements M2 and M4 are configured to optically modulate the split light beams $L(\lambda_{2,1})$ and $L(\lambda_{2,2})$ generated by the light splitting pattern P2 to generate optical signals S2 and S4. In the present embodiment, the multilayer optical waveguide structure 104 may further include light combining patterns P1' (indicated by a solid line) and P2' (indicated by a broken line), and the light combining patterns P1' and P2' may combine the optical signals with different wavelengths to generate a light combined signal.

For example, the multilayer optical waveguide structure 104 may use the light combining patterns P1' and P2' to guide the optical signals S1 and S2 to a same place (such as an intersection of the Y-shaped branch patterns), and the optical signals S1 and S2 originally transmitted in different optical waveguides are guided into a same optical waveguide by layer-to-layer transition and combined into a signal SC1. Similarly, the optical signals S3 and S4 transmitted in different optical waveguides may also be guided into a same optical waveguide in the same manner to generate a light combined signal SC2.

Figure 6:
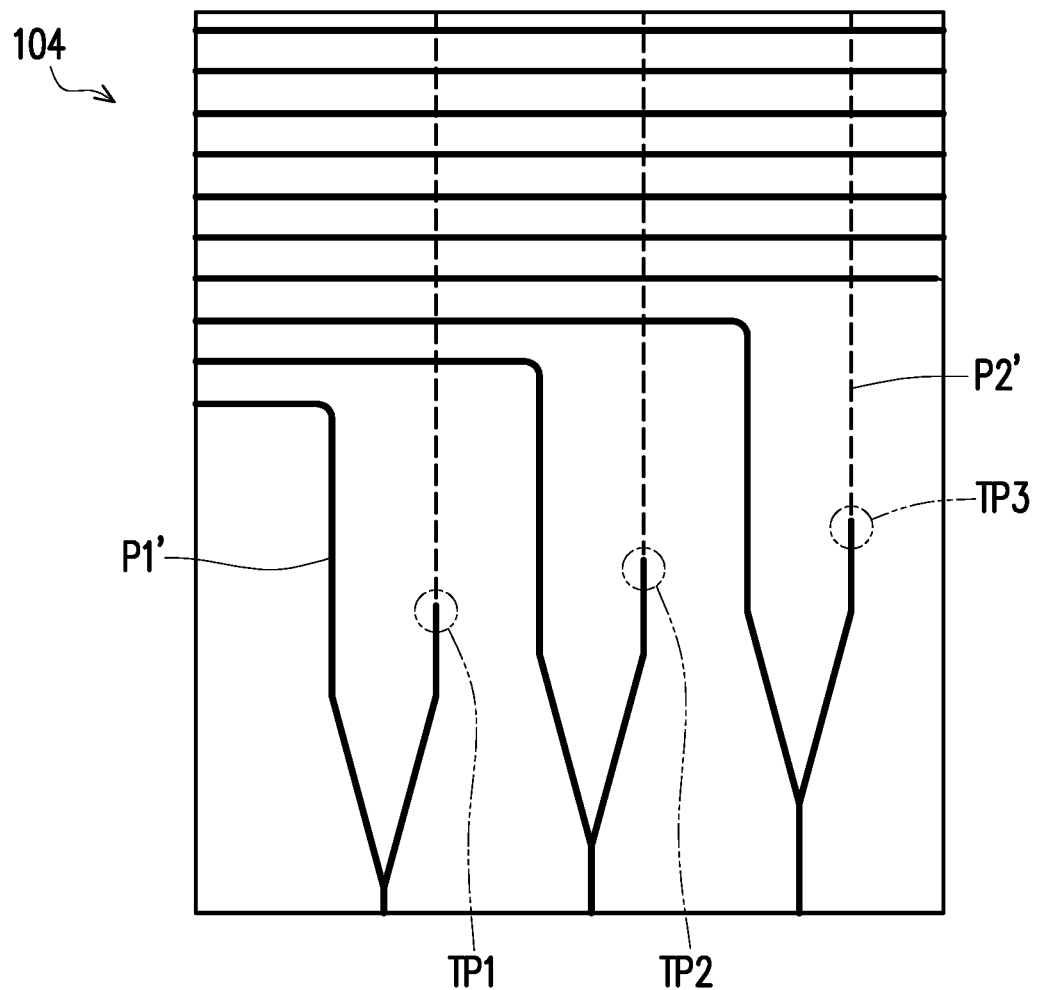
FIG. 6 is a schematic diagram of a multilayer optical waveguide structure in accordance with another embodiment of the disclosure.

It is to be noted that in some embodiments, the multilayer optical waveguide structure 104 may not perform layer-to-layer transition at the intersection of the Y-shaped branch patterns. For example, in the embodiment of FIG. 6, the multilayer optical waveguide structure 104 may perform layer-to-layer transition on optical signals of an optical pattern P2' before the optical signals reach the intersection of the Y-shaped branch patterns (for example, layer-to-layer transition is performed at transition points TP1, TP2 and TP3 of FIG. 6), and then the optical signals are guided by the light combining pattern P1' to be combined to generate a light combined signal.

Based on the above, the multilayer optical waveguide structure according to the embodiment of the disclosure includes a plurality of optical waveguides, which may perform layer-to-layer transition on light beams with different wavelengths before the light beams are guided to an intersection of light splitting patterns, so that the light beams with different wavelengths enter different optical waveguides, thereby effectively avoiding optical loss caused by excessive intersections of the waveguides in a same layer, and reducing the wafer area.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical signal generating apparatus, comprising:
a multilayer optical waveguide structure, comprising:
   a plurality of optical waveguides, disposed in different dielectric layers;
   and
   a first light splitting pattern and a second light splitting pattern, disposed in the optical waveguides, the first light splitting pattern and the second light splitting pattern transmitting and splitting light beams with a plurality of specific wavelengths respectively to generate a plurality of split light beams; and an optical modulator module, optically coupled to the multilayer optical waveguide structure, and configured to modulate the split light beams to generate a plurality of optical signals, wherein the first light splitting pattern comprises a first heterogeneous layer portion intersected with the second light splitting pattern in different dielectric layers to form a first intersection, the first heterogeneous layer portion and the second light splitting pattern are disposed in different optical waveguides, and the light beam with the specific wavelength, transmitted by the first light splitting pattern, is subject to a layer-to-layer transition before reaching the first intersection, so as to enter different optical waveguides, wherein at least one portion of the first light splitting pattern and at least one portion of the second light splitting pattern are disposed in the same dielectric layer.

2. The optical signal generating apparatus according to claim 1, wherein the light splitting patterns respectively comprise a plurality of branch points, and the light beams with different wavelengths enter different optical waveguides by the layer-to-layer transition when being guided to at least one of the branch points.

3. The optical signal generating apparatus according to claim 1, wherein the light beams with different wavelengths are subject to the layer-to-layer transition through overlapping parts of the optical waveguides and are guided to different optical waveguides.

4. The optical signal generating apparatus according to claim 1, wherein the split light beams corresponding to the first light splitting pattern and the second light splitting pattern have different wavelengths.

5. The optical signal generating apparatus according to claim 1, wherein the first light splitting pattern and the second light splitting pattern form a light splitting pattern group, and a wavelength difference among a plurality of light beams corresponding to the light splitting pattern group is less than a default value.

6. The optical signal generating apparatus according to claim 5, wherein the light splitting pattern group corresponds to an optical modulation element to respectively generate the optical signals.

7. The optical signal generating apparatus according to claim 1, wherein the first light splitting pattern comprises a Y-shaped branch pattern configured to split a corresponding light beam to generate $2^m$ split light beams, and m is a positive integer.

8. The optical signal generating apparatus according to claim 1, further comprising:
a light source module, optically coupled to the multilayer optical waveguide structure and configured to emit the light beams with different wavelengths.

9. The optical signal generating apparatus according to claim 1, further comprising:
a controller, coupled to the optical modulator module to drive a plurality of optical modulation elements in the optical modulator module.

10. An optical signal generating apparatus, comprising:
a multilayer optical waveguide structure, comprising:
a plurality of optical waveguides, disposed in different dielectric layers; and
a first light splitting pattern and a second light splitting pattern, disposed in the optical waveguides, the first light splitting pattern and the second light splitting pattern transmitting and splitting light beams with a plurality of specific wavelengths respectively to generate a plurality of split light beams;
an optical modulator module, optically coupled to the multilayer optical waveguide structure, and configured to modulate the split light beams to generate a plurality of optical signals,
wherein the first light splitting pattern comprises a first heterogeneous layer portion intersected with the second light splitting pattern in different dielectric layers to form a first intersection, the first heterogeneous layer portion and the second light splitting pattern are disposed in different optical waveguides, and the light beam with the specific wavelength, transmitted by the first light splitting pattern, is subject to a layer-to-layer transition before reaching the first intersection, so as to enter different optical waveguides; and
a third light splitting pattern and a fourth light splitting pattern, wherein the third light splitting pattern comprises a second heterogeneous layer portion intersected with the fourth light splitting pattern in different dielectric layers to form at least one second intersection, the second heterogeneous layer portion and the fourth light splitting pattern are disposed in different optical waveguides, and the light beam with the specific wavelength, transmitted by the third light splitting pattern, is subject to the layer-to-layer transition before reaching the second intersection, so as to enter different optical waveguides.

* * * * *